J. CHARTER.

CIGAR-MOLD.

No. 6,758. Reissued Nov. 23, 1875.

Witnesses.

John W. Alexander
Theodore H. Mack

Inventor.

John Charter

M. PETERS, PHOTO-LITHOGRAPHER, WASHINGTON, D. C.

UNITED STATES PATENT OFFICE.

JOHN CHARTER, OF STERLING, ILLINOIS.

IMPROVEMENT IN CIGAR-MOLDS.

Specification forming part of Letters Patent No. 116,930, dated July 11, 1871; reissue No. 6,758, dated November 23, 1875; application filed April 14, 1875.

*To all whom it may concern:*

Be it known that I, JOHN CHARTER, of the city of Sterling, in the county of Whitesides and State of Illinois, have invented a new and Improved Means for Molding Cigars; and I do hereby declare that the following is a full and exact description of the same, reference being had to the annexed drawing.

Figure 1:
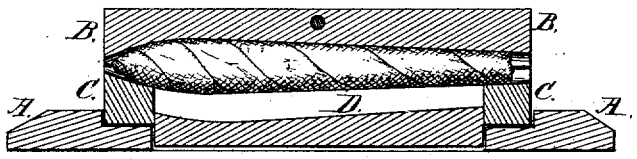
Figure 2:
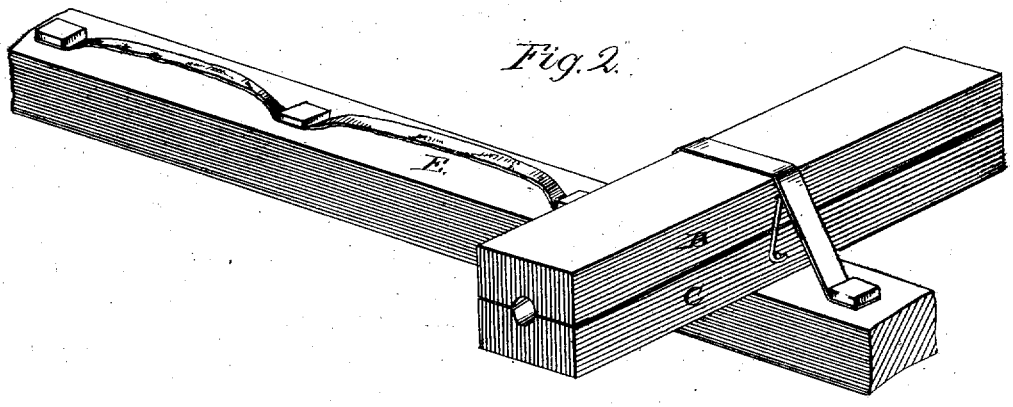

Figure 1 represents the mold with the sliding block D depressed. Fig. 2 shows the mold closed.

The nature of my invention consists in the slotted block A and the blocks B and C, the latter provided with the sliding block D, fitted into its base, all used in connection with the board E and rubber rings to said board E, attached for the purpose of molding cigars.

To enable others skilled in the art to make and use my invention, I will proceed to describe its construction and operation.

I construct the block A, with the parallelogram slot, as shown in the accompanying drawing, out of any suitable wood, and the blocks B and C are each faced, so as to fit closely together, also made of any suitable wood, and each having in its said fitting face a groove cut the shape and proportion of one-half of the cigar desired to be molded; also, in the base of the block C a recess is cut from the bottom of said block C through and into said groove in said block C. Into this recess in said block C is fitted the sliding wooden block D, the latter being made of such size and shape as to be moved readily in said recess, and that when said sliding block D is forced into said block C, so that the outside surface of said sliding block is on a line with the bottom of said block C, the groove on the inner face of said sliding block D exactly comports with and makes perfect the said groove in said block C.

The board E is made of wood of any desired length, having attached to its upper surface the said rubber rings, with such distance between the said rings as to allow, without inconvenience, of the insertion into said rings, and withdrawal therefrom, of said molds. The said block C is provided, also, with a staple on either side, and the block B with the hooks, to fasten into said staples when the mold is closed.

The mode of operating said mold is as follows: The slotted block A is laid upon any smooth surface. The block C is then laid upon the block A, with the said sliding block D directly over the slot in said block A, and with the groove in block C upward. The operator then, by the insertion of two fingers in the groove in said block C, forces the said sliding block down into said slot in said block A. The cigar is then placed in the groove in block C, and block B placed on block C, so that the grooves and faces of blocks B and C may correspond. The said hooks are then fastened or pushed into said staples, and the blocks B and C, thus fastened together, are lifted out of block A, and by pressing them downward on a smooth surface, with the said sliding block downward, the said sliding block is forced up into said block C until the lower surface of the sliding block D and the block C are on an exact line. The mold is then placed in the rubber rings until the cigar is sufficiently hardened to retain its shape.

The said sliding block D should fit into the recess in block C sufficiently tight not to drop out when the molds are lifted with the sliding block downward.

One advantage for this mold is, that the cigar need not be turned after being placed in the molds, and no crease is left in the sides of the cigar when taken from the molds.

I make no claim to the board E and the rubber rings thereto attached; but

What I do claim as my invention, and desire to secure by Letters Patent, is—

1. In combination with the parts B and C of the mold, the sliding block D, operating substantially in the manner and for the purpose specified.

2. The combination of blocks B C D and frame A, substantially as and for the purpose specified.

JOHN CHARTER.

Witnesses:

ABRAHAM CASSEL,

GEO. CAZINE.